United States Patent
Xia et al.

(10) Patent No.: US 9,538,339 B2
(45) Date of Patent: Jan. 3, 2017

(54) METHOD AND SYSTEM OF OUTPUTTING IN A VEHICLE DATA STREAMED BY MOBILE APPLICATIONS

(71) Applicant: Ford Global Technologies, LLC, Dearborn, MI (US)

(72) Inventors: Yiping Xia, Shanghai (CN); Douglas VanDagens, Beverly Hills, MI (US); Edward Andrew Pleet, Livonia, MI (US); Doron M. Elliott, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 366 days.

(21) Appl. No.: 13/761,451

(22) Filed: Feb. 7, 2013

(65) Prior Publication Data
US 2014/0220948 A1 Aug. 7, 2014

(51) Int. Cl.
*H04M 3/42* (2006.01)
*H04W 4/04* (2009.01)

(52) U.S. Cl.
CPC .................................. *H04W 4/046* (2013.01)

(58) Field of Classification Search
CPC ........ H04W 4/04; H04W 12/06; H04W 88/04; G06Q 30/0267; B60R 11/0235; B60R 11/0241; H04M 1/6091; H04M 2250/10; H04M 1/6075; H04M 2250/02; H04M 2250/74
USPC ....................................................... 455/415
See application file for complete search history.

(56) References Cited

U.S. PATENT DOCUMENTS

| | | | |
|---|---|---|---|
| 6,233,468 | B1 | 5/2001 | Chen |
| 6,427,115 | B1 * | 7/2002 | Sekiyama ..................... 701/526 |
| 6,526,335 | B1 | 2/2003 | Treyz et al. |
| 6,564,056 | B1 | 5/2003 | Fitzgerald |
| 6,970,940 | B1 | 11/2005 | Vogel et al. |
| 6,992,583 | B2 | 1/2006 | Muramatsu |
| 7,207,041 | B2 | 4/2007 | Elson et al. |
| 7,251,330 | B2 | 7/2007 | Terao et al. |
| 7,266,435 | B2 | 9/2007 | Wang et al. |
| 7,386,393 | B2 | 6/2008 | Zabel et al. |
| 7,505,784 | B2 | 3/2009 | Barbera |

(Continued)

OTHER PUBLICATIONS

Telit Wireless Solutoins, AT Commands Reference Guide, 800005110025a Rev. 13—Mar. 20, 2012, pp. 1-565.

*Primary Examiner* — Timothy Pham
(74) *Attorney, Agent, or Firm* — Jennifer M. Stec; Brooks Kushman P.C.

(57) ABSTRACT

A system for outputting visual data from a mobile device application on a mobile computing device to a vehicle display, the system comprising a wireless transceiver for communicating signals between a mobile computing device and a vehicle computing system having a graphical display. The vehicle computing system is configured to receive caller identification from the mobile computing device identifying a mobile device application configured to operate with the vehicle computing system. The vehicle computer system is also configured to receive a signal from the mobile computing device representative of a visual indication to be displayed on the vehicle display. The vehicle computer system may determine a location to display the visual indication on the display and output the visual indication on the vehicle display at the determined location.

20 Claims, 4 Drawing Sheets

(56) References Cited

U.S. PATENT DOCUMENTS

| | | |
|---|---|---|
| 7,602,782 B2 | 10/2009 | Doviak et al. |
| 7,801,941 B2 | 9/2010 | Conneely et al. |
| 2002/0098853 A1 | 7/2002 | Chrumka |
| 2002/0098878 A1 | 7/2002 | Mooney et al. |
| 2002/0169551 A1* | 11/2002 | Inoue et al. .................. 701/213 |
| 2003/0079123 A1 | 4/2003 | Mas Ribes |
| 2003/0147534 A1 | 8/2003 | Ablay et al. |
| 2004/0137925 A1 | 7/2004 | Lowe et al. |
| 2004/0203660 A1 | 10/2004 | Tibrewal et al. |
| 2004/0260438 A1 | 12/2004 | Chernetsky et al. |
| 2004/0267585 A1 | 12/2004 | Anderson et al. |
| 2005/0091408 A1 | 4/2005 | Parupudi et al. |
| 2005/0177635 A1 | 8/2005 | Schmidt et al. |
| 2006/0150197 A1 | 7/2006 | Werner |
| 2006/0156315 A1 | 7/2006 | Wood et al. |
| 2006/0190097 A1 | 8/2006 | Rubenstein |
| 2006/0287787 A1 | 12/2006 | Engstrom et al. |
| 2006/0287821 A1 | 12/2006 | Lin |
| 2007/0016362 A1 | 1/2007 | Nelson |
| 2007/0042809 A1 | 2/2007 | Angelhag |
| 2007/0042812 A1 | 2/2007 | Basir |
| 2007/0050854 A1 | 3/2007 | Cooperstein et al. |
| 2007/0132572 A1 | 6/2007 | Itoh et al. |
| 2007/0140187 A1 | 6/2007 | Rokusek et al. |
| 2007/0294625 A1 | 12/2007 | Rasin et al. |
| 2008/0019440 A1 | 1/2008 | Lee et al. |
| 2008/0148374 A1 | 6/2008 | Spaur et al. |
| 2008/0220718 A1 | 9/2008 | Sakamoto et al. |
| 2008/0313050 A1 | 12/2008 | Basir |
| 2009/0075624 A1 | 3/2009 | Cox et al. |
| 2009/0106036 A1 | 4/2009 | Tamura et al. |
| 2009/0117890 A1 | 5/2009 | Jacobsen et al. |
| 2009/0228908 A1 | 9/2009 | Margis et al. |
| 2009/0253466 A1 | 10/2009 | Saito et al. |
| 2009/0318119 A1 | 12/2009 | Basir |
| 2010/0037057 A1* | 2/2010 | Shim et al. .................... 713/171 |
| 2010/0063670 A1 | 3/2010 | Brzezinski et al. |
| 2010/0094996 A1 | 4/2010 | Samaha |
| 2010/0098853 A1 | 4/2010 | Hoffmann et al. |
| 2010/0216509 A1 | 8/2010 | Riemer et al. |
| 2010/0234071 A1 | 9/2010 | Shabtay et al. |
| 2010/0268401 A1* | 10/2010 | Blakemore et al. ............. 701/2 |
| 2010/0273417 A1 | 10/2010 | Tian et al. |
| 2010/0306309 A1 | 12/2010 | Santori et al. |
| 2011/0014871 A1 | 1/2011 | Sato et al. |
| 2011/0105097 A1 | 5/2011 | Tadayon et al. |
| 2011/0112762 A1 | 5/2011 | Gruijters et al. |
| 2011/0136435 A1* | 6/2011 | Taniguchi ..................... 455/41.2 |
| 2011/0143726 A1 | 6/2011 | de Silva |
| 2011/0187547 A1* | 8/2011 | Kweon ......................... 340/670 |
| 2011/0195659 A1 | 8/2011 | Boll et al. |
| 2011/0254692 A1* | 10/2011 | Furuta ......................... 340/636.1 |
| 2011/0296037 A1 | 12/2011 | Westra et al. |
| 2012/0046808 A1* | 2/2012 | Furuta .................. G01C 21/362 701/2 |
| 2012/0054300 A1 | 3/2012 | Marchwicki et al. |
| 2012/0065815 A1* | 3/2012 | Hess ................................ 701/2 |
| 2012/0079002 A1 | 3/2012 | Boll et al. |
| 2012/0196583 A1 | 8/2012 | Kindo |
| 2012/0242510 A1* | 9/2012 | Choi et al. .................... 340/988 |
| 2012/0252431 A1* | 10/2012 | Gee et al. ................... 455/422.1 |
| 2013/0053009 A1* | 2/2013 | Yanai et al. .................. 455/415 |
| 2013/0137415 A1* | 5/2013 | Takikawa ...................... 455/418 |

\* cited by examiner

METHOD AND SYSTEM OF OUTPUTTING IN A VEHICLE DATA STREAMED BY MOBILE APPLICATIONS

TECHNICAL FIELD

The illustrative embodiments generally relate to an apparatus and method for outputting data from a mobile device for display at a vehicle.

BACKGROUND

Below, a few prior art entertainment systems are described. Additional details of these systems may be obtained from the identified references below.

U.S. Pat. No. 7,386,393 discloses a system that allows users to be provided with the option of having destination information, such as a street address and/or destination phone number, obtained from online mapping services, transmitted to their vehicle's navigation system. In certain embodiments, the user may logon to an online vehicle server to provide information necessary to identify their respective vehicle. Once the target vehicle is identified, the destination information may be transmitted to this vehicle by the vehicle server, after which the vehicle's navigation and communication system may be automatically populated with the received destination information.

U.S. Pat. No. 6,992,583 discloses a cellular phone that places a call to vehicle navigation apparatus, performs ID matching, and acquires information on the position of the vehicle measured by the vehicle navigation apparatus. The cellular phone acquires peripheral map data including the position of the owner of the vehicle and the position of the vehicle where the vehicle navigation apparatus is mounted from a position information center and displays the data acquired together with the data on the positions.

SUMMARY

A first illustrative embodiment comprises a system for outputting visual data from a mobile device application on a mobile computing device to a vehicle display, the system comprising a wireless transceiver for communicating signals between a mobile computing device and a vehicle computing system having a graphical display. The vehicle computing system is configured to receive caller identification from the mobile computing device identifying a mobile device application configured to operate with the vehicle computing system. The vehicle computer system is also configured to receive a signal from the mobile computing device representative of a visual indication to be displayed on the vehicle display. The vehicle computer system may determine a location to display the visual indication on the display and output the visual indication on the vehicle display at the determined location.

A second illustrative embodiment includes a mobile device utilizing a mobile application that outputs visual data to a vehicle computer system to be output on a vehicle display. The device comprises a wireless transceiver for communicating signals from the mobile device to the vehicle computing system for processing by the vehicle computing system. The device further comprises a processor configured to send a caller identification to the vehicle computer system using the wireless transceiver, the caller identification identifying the mobile application, receive a request from the vehicle computer system to send the visual data to the vehicle computer system, and send a wireless signal to the vehicle computing device representative of a visual indication to be displayed in the vehicle.

A third illustrative embodiment includes a vehicle computing system comprising a wireless transceiver for communicating signals between a mobile device and the vehicle computer system. The vehicle compute system also includes a processor configured to receive a calling line identification presentation from the mobile device identifying an application is operating on the mobile device, receive a visual indication from the application of the mobile device, and output the indication on a vehicle display.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which illustrative embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

Many new features and functionality are packed into our phones, tablets, MP3 players, etc. However, many of these features are not developed with the vehicle environment in mind. Increasing interoperability of mobile devices with a vehicle's computing system allows customers to have a seamless experience whether or not they are in a vehicle environment. One illustrative example of a seamless customer experience is allowing the navigation application on a user's nomadic device to interact with a vehicle's computing system. Rather than have turn by turn voice prompts and directions played over the mobile device's speakers, the mobile device may be able to utilize the vehicle's speakers to output directions and voice prompts. This can also eliminate the scenario of a vehicle's speakers playing audio over a mobile device's voice prompt or directions, which can cause the driver to miss an important maneuver. It also may allow the driver to completely ignore the mobile device's voice prompts or directions in a scenario when the user may want to ignore the directions, such as, but not limited to, during a phone conversation.

Figure 1:
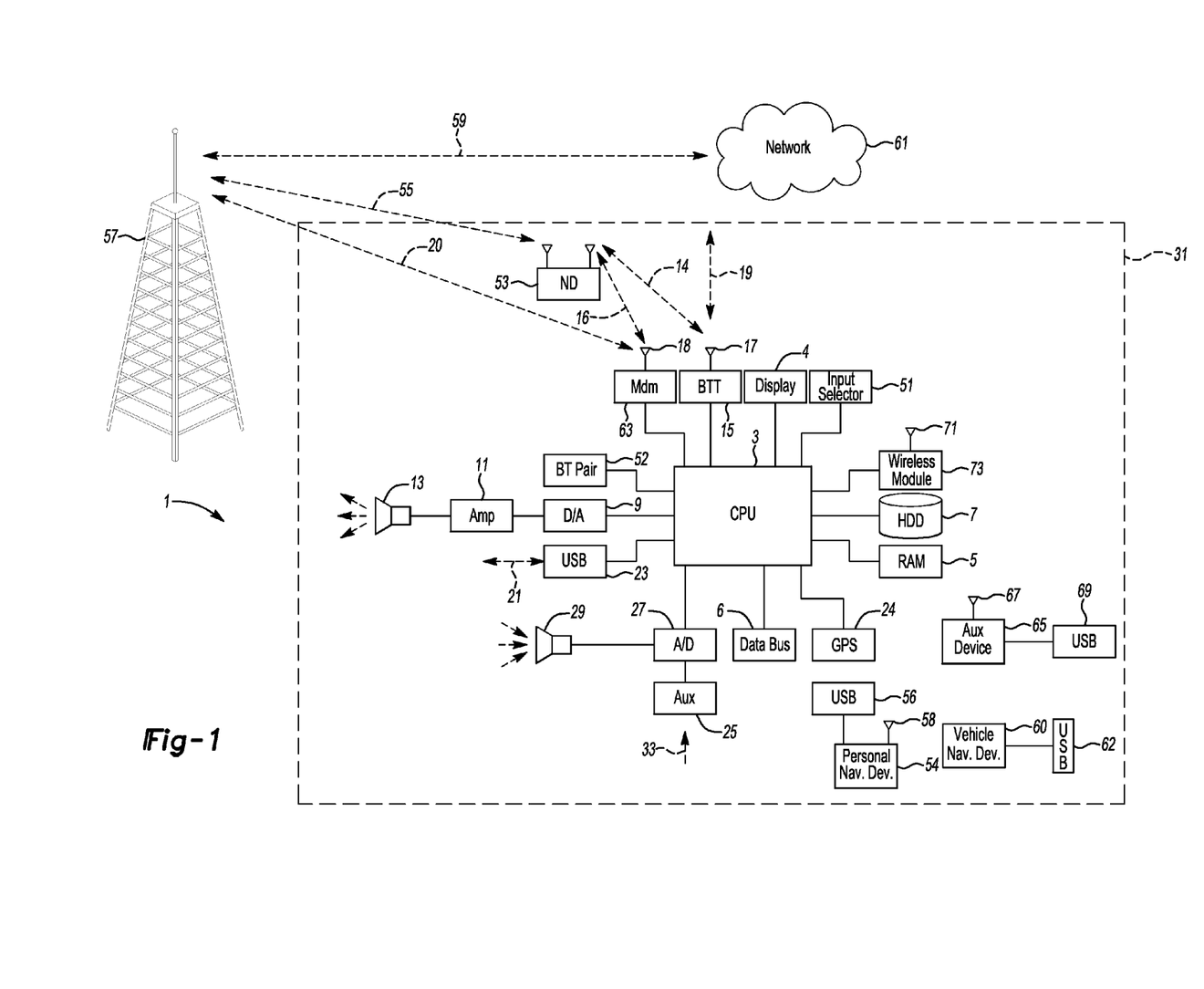
FIG. 1 illustrates an example block topology for a vehicle based computing system for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to select between various inputs. Input to both the microphone and the auxiliary connector is converted from analog to digital by a converter 27 before being passed to the processor. Although not shown, these and other components may be in communication with the VCS over a vehicle multiplex network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data- plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, nomadic device, key fob and the like.

Also, or alternatively, the CPU could be connected to a vehicle based wireless router 73, using for example a WiFi (IEEE 803.11) 71 transceiver. This could allow the CPU to connect to remote networks in range of the local router 73.

In another embodiment, the CPU may be in communication with an audio control module. The CPU may send various can messages directed to the audio control module that is indicative of the amount of attenuation that is required.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
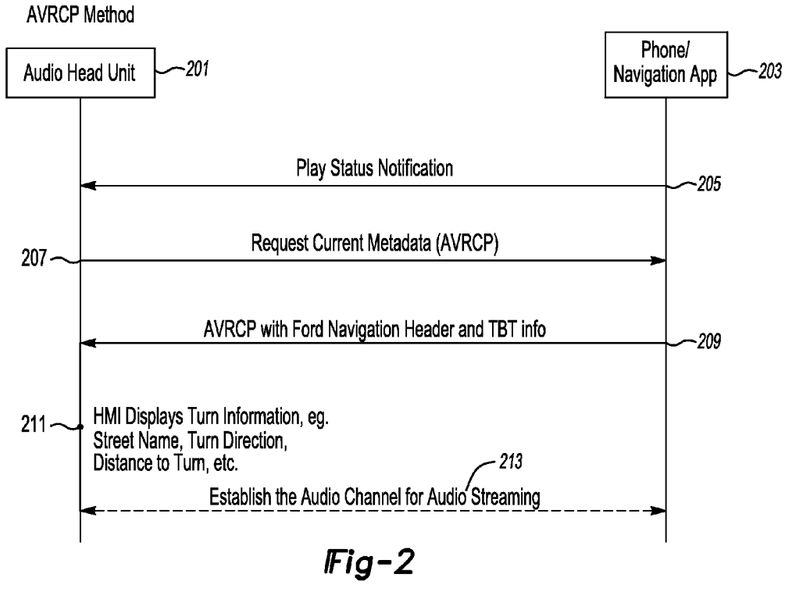
FIG. 2 illustrates an example use case of a vehicle based computing system interfacing with a nomadic device or an application by utilizing a Bluetooth audio video remote control profile (AVRCP).

FIG. 2 illustrates an illustrative use case of a head unit interfacing with an application by utilizing Bluetooth Audio/Video remote Control Profile (AVRCP). The use case described in FIG. 2 may utilize asynchronous data mapped over Bluetooth's Logical Link Control and Adaptation Protocol (L2CAP) layer utilizing asynchronous connection-oriented logical transport (ACL) packets. Asynchronous data may utilize start and stop bits to signify the beginning bit and the end bit. Asynchronous data may be used when data is sent. This may allow a receiver to recognize when the second packet of information is being sent. The application layer of the Bluetooth protocol may be utilized to help facilitate the audio arbitration.

A head unit 201 or vehicle computing system (VCS) 201 may be connected with a nomadic device 203 that is utilizing an application, such as but not limited to a navigation application. Upon connection, the nomadic device and VCS may interact with each other for various reasons, such as but not limited to, streaming music, hands-free calling, a navigation application, etc. The nomadic device and VCS may need to communicate with one another in order to arbitrate the application's incoming audio with the audio source currently utilized on the VCS. The nomadic device may also send various visual indications to the vehicle computer system for display in the vehicle.

The VCS may regularly determine the audio state condition of the VCS in order to arbitrate the audio. Some non-limiting examples of the audio state condition include, but are not limited to, a phone call, AM, FM, CD, Aux, USB, iPod, BT audio, etc. It is also possible that the audio state of the VCS is nonexistent and that no audio source is currently playing. For example, the vehicle's radio may be off or muted, and nothing is being played through the speakers or output by the amplifier. Each audio source may be individually handle audio arbitration differently, dependent on the VCS's execution.

The nomadic device or an application may send a play status notification 205 to the VCS. The play status notification may simply request to utilize the vehicle speakers or request to open the audio channel. It may also be utilized to send a text or graphical image to the display. The text or graphical image may be utilized to send turn by turn directions, contact information, contact images or pictures, traffic display images, and other things. The VCS may then request the nomadic device or application to supply the current metadata 207 via the Audio Video Remote Control Profile (AVRCP). The nomadic device/application may then send data/metadata, which may include turn by turn information, to the VCS utilizing AVRCP 209. Prior to sending the data, the nomadic device may need to convert the original data into metadata, or a specific form of data, to pass through via AVRCP. The metadata may include a header indicating it is a specific application requesting to utilize the VCS.

Upon receiving the contents of the data, the VCS may analyze the data or metadata. The VCS may utilize an API, look-up table, or another similar software method to determine how to utilize the data. The VCS's HMI may then display various information, such as turn by turn information, upon receiving the data 211. In one example, the VCS may receive data indicating that the nomadic device is requesting to display turn by turn directions. The VCS may utilize an API to determine exactly how the VCS should display the turn by turn directions on the current HMI screen that is being utilized by the users of the vehicle. In another example, the VCS may receive data indicative of a traffic map that may be utilized as an overlay of the current HMI screen. The VCS may utilize a look-up table to determine exactly which traffic map to utilize for the current scenario. In another scenario, the nomadic device and the VCS may utilize customized messaging via AVRCP to utilize the data that is being communicated. Dependent on the current HMI display screen of the VCS user interface and the current data that is being streamed by the nomadic device, different situations may arise that cause the visual data to be presented to the user in a specific manner.

The metadata may also include other information for various uses to be displayed by the VCS. For example, in one non-limiting illustrative embodiment, the metadata may include turn by turn (TBT) information to indicate an upcoming maneuver on the vehicle's display. For example, the TBT information may include data to indicate the type of turn to take, the street to take the turn on, the distance until the turn, or guidance announcement information. In other illustrative examples, traffic or weather information may be included in the metadata to be displayed by the VCS.

The VCS may also receive data that may include a specific header along with other information, such as audio arbitration data. The VCS may analyze the header to determine that it is authorized to utilize the components of the VCS. For example, the VCS may deny utilization of an application if the header does not match the expectation of the VCS. If the VCS receives the appropriate header, the application and nomadic device may allow data to for utilization of the VCS. Various security methods may be utilized to prevent corrupt applications from passing data to the VCS.

Once verified, the VCS may utilize the Audio/Video Distribution Transport Protocol (AVDTP) to start streaming an audio request 213. AVDTP may define audio/video stream negotiation, establishment, and transmission procedures. AVDTP may be utilized to apply point-to-point signaling over a connection-oriented L2CAP channel. The AVDTP request may be accepted based on the special header which is sent via AVRCP. If the AVDTP information has been verified, the VCS may allow for audio to be played from the nomadic device. The nomadic device and application may send the audio data or graphical data via the advanced audio distribution profile (A2DP) to the VCS. Some illustrative examples of audio data that may be streamed by the application include guidance for maneuvers or traffic information. For example, the nomadic device may stream audio stating "Make a right turn in 300 feet onto Michigan Avenue." In another illustrative example, the nomadic device may stream audio stating "Traffic is free flow on the Southfield Freeway."

Figure 3:
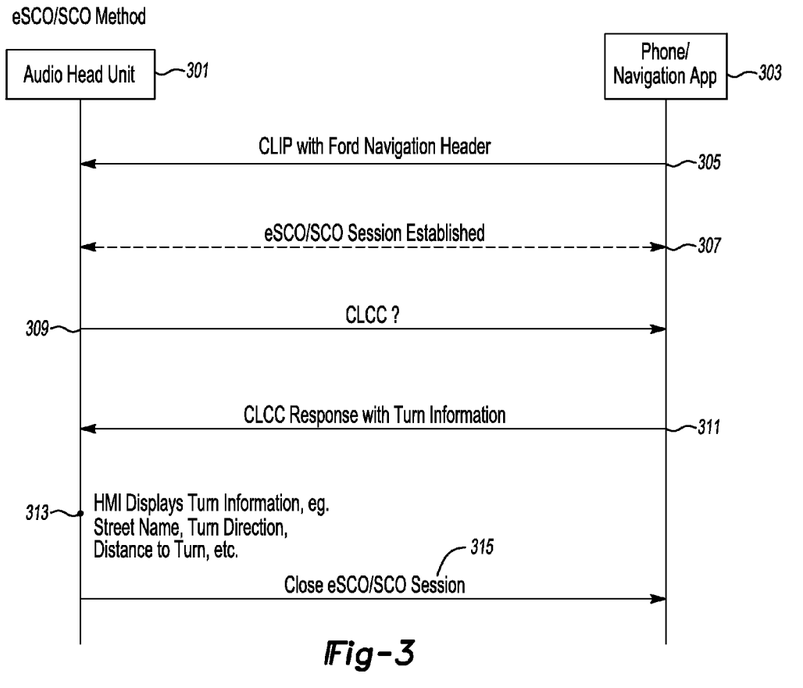
FIG. 3 illustrates an example use case of a vehicle based computing system interfacing with an application by utilizing enhanced synchronous connection-oriented links (eSCO) or synchronous connection-oriented links (SCO) method.

FIG. 3 depicts an illustrative use case of a VCS 301 interfacing with a nomadic device or application 303 by utilizing enhanced synchronous connection-oriented links (eSCO) and synchronous connection-oriented links (SCO) method. SCO and eSCO packets do not use L2CAP and may be treated separately in the Bluetooth specification; therefore, the L2CAP parameters in Bluetooth are not applied to synchronous data. The eSCO/SCO links may utilize synchronous data, therefore, no start and stop bits may be used. Instead, a continual stream of data may be sent between two nodes. The application layer of the Bluetooth protocol may be utilized to facilitate audio arbitration.

The nomadic device may utilize caller ID (caller identification, CID), or additional formats such as calling line identification (CLID), calling number delivery (CND), calling number identification (CNID) or calling line identification presentation (CLIP). Caller ID may be available in analog and digital phone systems and most voice over Internet Protocol (VoIP) applications, that transmit a caller's number to the called party's telephone equipment during the ringing signal, or when the call is being set up but before the call is answered. When available, caller ID can also provide a name associated with the calling telephone number. The information made available to the called party may be displayed on a telephone's display, on a separately attached device, or be processed by an attached computer with appropriate interface hardware.

The nomadic device may send a CLIP with a header 305 indicating the nomadic device is configured to be utilized with the VCS for non-traditional Bluetooth functions. The header distinguishes the CLIP from a typical phone call and may allow the VCS to utilize the CLIP to display information. The VCS may analyze the CLIP and determine that information may be displayed in a specific manner due to contents of the CLIP, along with, among other things, the condition state of the VCS and nomadic device. The contents of the header may be an alpha-numeric number that may not typically be functional on a mobile phone, such as the number "99999" or "9*#12". Thus the contents are typically an alpha-numeric set that is incapable of establishing a phone call on a phone line. The nomadic device or application may then send a request to establish and open an eSCO/SCO session. The nomadic device may request to open the session when incoming data, such as guidance instructions, or other data is ready for utilization with the VCS.

The nomadic device may also send application identifier data to the vehicle computer system. The application identifier data may indicate the type or actual application that is running on the nomadic device. The application identifier data may also include an indicator that the application is configurable and operable to work with the vehicle computer system. The VCS may not allow all outside applications to run on the VCS due to security restraints, therefore the application identifier data may be useful to indicate different applications that do not pose a security threat or that are operable to run with the VCS.

Upon receiving the CLIP with the header and the request to open eSCO/SCO link, the VCS may analyze the current condition of the VCS user interface to determine if opening the eSCO/SCO session is appropriate. If the VCS determines that it is appropriate to open the audio session, the VCS may grant the request. However, if the VCS determines that the audio session should not be opened, the VCS will deny the request. In one illustrative example, the current audio source may be a phone call when the VCS receive the CLIP with the special header. The VCS may determine that the request should not be granted, due to the phone call receiving importance over the nomadic device's application. Therefore, the VCS may ignore the request to open or pass back data or a message to the nomadic device indicating the request to open could not be granted. However, if the VCS determines the request should be granted, the VCS will initialize the audio session to be open between the nomadic device and the VCS.

Upon opening the eSCO/SCO link 307, an audio session may also open between the VCS and the nomadic device. By opening of the audio session, the nomadic device may be allowed to send data to the VCS. The data may be utilized to output graphic data, such as turn by turn maneuver information or traffic. The VCS may also utilize AT commands or a Hayes command to make requests of data. AT commands or a Hayes command set can be utilized to command a modem, phone, or another nomadic device to complete certain commands. In one illustrative example, a command that may be utilized is the CLCC command, which is a request to list current calls. In an illustrative example, the VCS may request the CLCC command 309 based on the CLIP with the header.

Upon receiving the request of the CLCC from the VCS, the nomadic device may respond by either providing a CLCC 311 with various information, or by simply ignoring the request. The nomadic device may respond with the CLCC that contains data indicative of information, such as turn by turn, weather, traffic, etc. The VCS may analyze the data upon receiving of the CLCC with the data. The VCS may transform the data for appropriate presentation on the HMI 313. Different conditions of the VCS's HMI state (e.g. current displayed screen or use of specific functions) and of the nomadic device may indicate how the information is presented to the user. Furthermore, other vehicle information, such as the vehicle speed, gyroscope, accelerometer, etc., may be used to display the information in a specific manner.

The nomadic device or application may also be able to play audio upon opening the audio session. The nomadic device or application may begin to stream audio data via the Bluetooth connection. The VCS may then play the audio or guidance instructions or other audible information through the vehicle's speakers. Audio arbitration may be executed by the VCS may also play the streamed audio over specific speakers or to a volume level relative to the current audio source played by the VCS.

The nomadic device may send a request to close the eSCO/SCO link when streaming of audio is completed by the application. The nomadic device may send a message to the VCS requesting that the link is terminated or closed. The VCS can also determine if there is a need the need to leave the link open, thus passing a message to the nomadic device to provide additional data. If the VCS determines that the link is no longer needed to stream audio, the VCS will grant the request and close the eSCO/SCO link 315.

Figure 4:
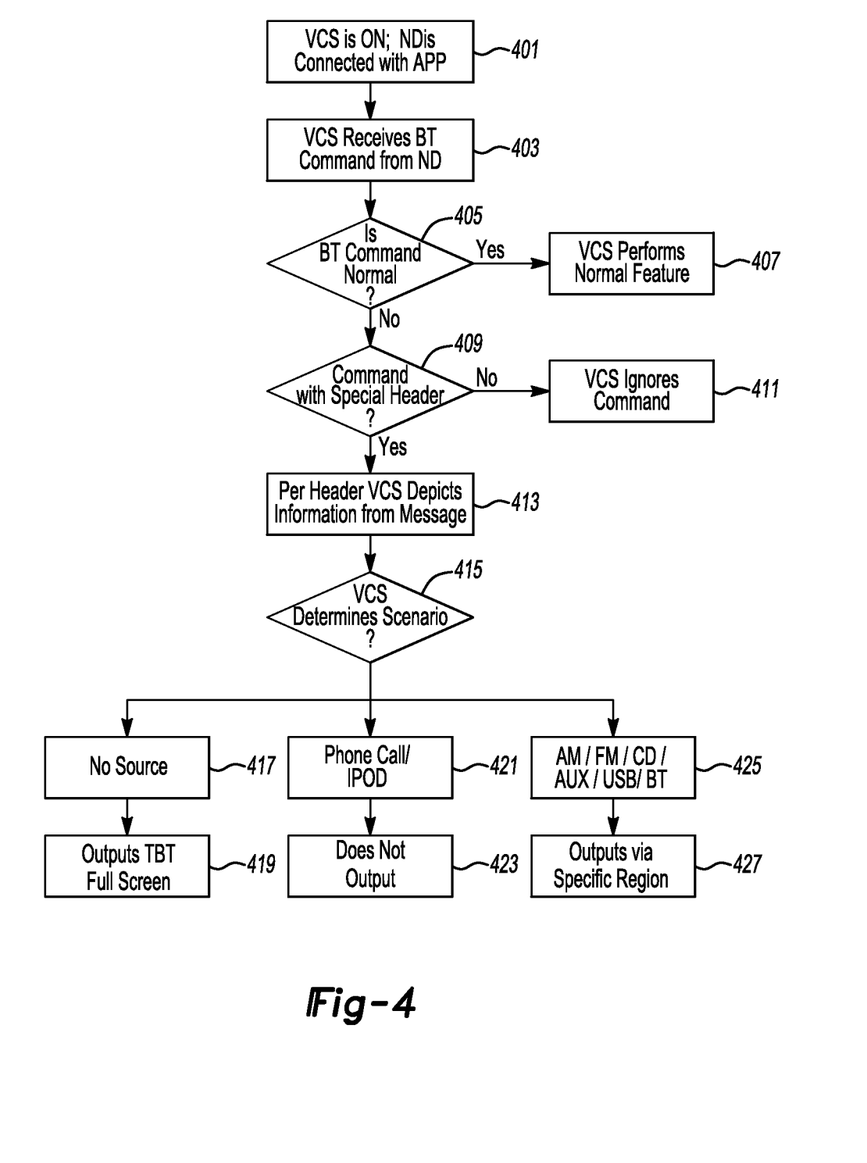
FIG. 4 illustrates an example flow chart of graphical output arbitration between a nomadic device and a vehicle based computing system.

FIG. 4 is in an illustrative flow chart of graphical output arbitration based on different use case scenarios. The VCS may be powered on and communicating with a nomadic device which is running a navigation application 401, or any other application that may stream data from a nomadic device to the VCS. The VCS may be in communication with the nomadic device by a Bluetooth connection or another wireless connection. The VCS may then monitor for requests or commands that were sent from the nomadic device and receive the requests or commands from the nomadic device 403, or vice versa. Upon receiving a request from the nomadic device, the VCS will determine if the request/command is utilizing normal functionality 405, such as those that are standardized amongst the Bluetooth protocol and specification. If the request or command is utilizing typical functionality 407, the VCS will perform the request with respect to the normal logic, HMI, and flow. However, if the nomadic device is not requesting to utilize typical functionality, the VCS will analyze the request. After the VCS analyzes the data, the VCS may determine if the request/command carries a header to indicate it is a specific, application 409 that is configured to work with the VCS. The header may also indicate the type of application that is requesting to utilize the VCS. The command header may be sent utilizing the Bluetooth AVRCP profile or eSCO/SCO method. Furthermore, the command may include AT commands that are typically utilized to control the phone. AT commands or a Hayes command set can be utilized to command a modem or phone to complete certain commands. One illustrative example of a command that may be utilized is CLCC, which is a request to list current calls. The VCS may ignore the command 411 if the header or other data is not found in the Bluetooth command set.

According to the command, the VCS will depict information 413 via the AVRCP message depending on the HMI state/condition of the VCS 415. For example, if no audio source 417 is being utilized on the VCS, the VCS may use the HMI template designed for displaying information received by the nomadic device. If no audio source is present, the graphical data from the nomadic device may be output dependent on the HMI template currently being utilized by the VCS. The VCS may then output the graphical data to be viewed via the full display screen 419. It is possible that audio may be played over the vehicle speakers and indicate upcoming guidance based on data that is sent from the nomadic device. The audio may correspond to the graphical/visual data. The VCS may not need to arbitrate audio if no audio source is currently functioning.

In another illustrative example, if the VCS's current audio source is a phone call or an iPod 421, the VCS may ignore the audio prompt and leave the current audio source as the phone call or iPod 423 to prevent the user's conversation from being interrupted. The phone call may originate from the nomadic device or from another nomadic device or phone in the vehicle that is also connected to the VCS. In another scenario, the phone call's conversation may be muted and the navigation guidance may be output over the vehicle's speakers. The VCS will also depict the graphic or textual data received from the nomadic device dependent on the HMI template utilized by the phone screen or iPod screen of the VCS.

In yet another illustrative example, the VCS's current audio source maybe a non-Bluetooth audio source, such as AM, FM, CD, Aux, USB, etc. 425. Upon receiving the AVRCP command with the special header, the VCS may attenuate or mute the current source's audio 427 to allow the audio or guidance prompts to be played over the vehicle's speakers. Furthermore, it may use an HMI template designed for showing metadata to display turn by turn information carried in the AVRCP command. For example, if a right turn onto Michigan AVE is approaching, the audio prompt may say "Upcoming right turn onto Michigan Avenue." The HMI template designed may show a picture of a right turn arrow with a street sign of Michigan Avenue to depict the upcoming maneuver to the user. Audio data, picture data, text data, etc. may all be sent from the nomadic device to be utilized on the VCS. The VCS will also depict the graphic or textual data received from the nomadic device dependent on the HMI template utilized by the various audio screens.

In yet a further illustrative example, the VCS's current audio source may be a Bluetooth audio source 429 streaming from the nomadic device. For example, the nomadic device may be streaming audio from a user's phone (e.g. Smartphone, iPhone, Android Phone, etc.) or digital audio player (e.g. iPod touch, etc.) while utilizing a navigation application on the phone or digital audio player. The VCS and nomadic device may determine if the nomadic device is currently streaming audio 431. Upon determining that the VCS is currently streaming audio, the VCS may not attempt to arbitrate the audio and allow the nomadic device to handle the arbitration 435. If the phone is not streaming audio via Bluetooth, the VCS may display the information (e.g. turn by turn information) carried in the AVRCP command and/or stream the audio 433 over A2DP (advanced audio distribution profile). For example, if the current audio source is Bluetooth but the nomadic device is not streaming because it is paused or stopped, the VCS may stream the incoming audio. The VCS will also depict the graphic or textual data received from the nomadic device dependent on the HMI template utilized by Bluetooth audio screen of the VCS.

Figure 5A:
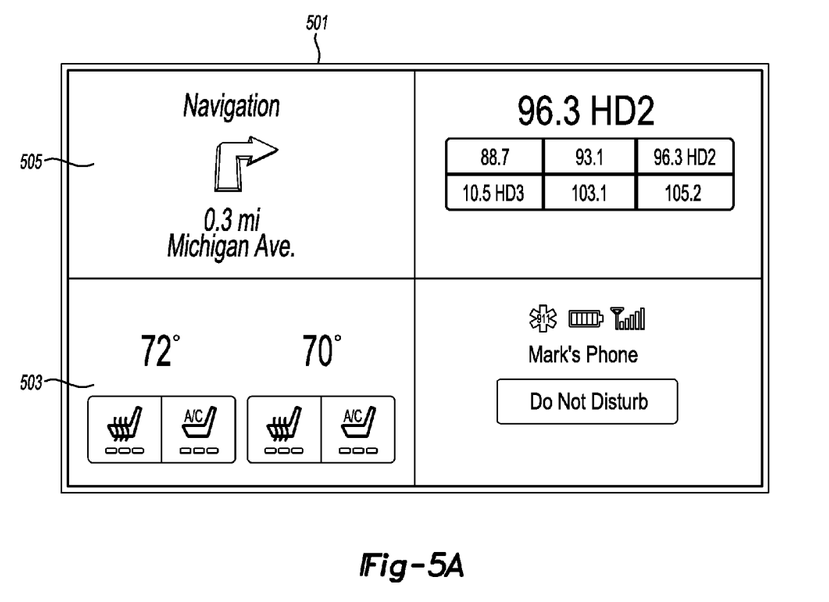
FIG. 5A illustrates a vehicle display outputting navigation guidance instructions.

FIG. 5A illustrates another illustrative display of navigation guidance instructions displayed on a vehicle based computing system utilizing a LCD display. Although FIG. 5A illustrates one HMI template that may be utilized for display the received data, a number of different figures may be utilized. For example, each dedicated screen of the multimedia system may be utilized to display the turn by turn directions. Furthermore, the text or graphics that are received by the VCS may take up the whole screen rather than just a portion of the screen.

The multimedia screen 501 may be utilized to display the incoming data that may include turn by turn directions, traffic information, weather information, and other data. Although a multimedia system is utilized in FIG. 5A, the data may also be sent to an instrument cluster display, a heads up display, a rear seat entertainment system, or any other display that is utilized in the vehicle. The displays may be traditional VGA displays, TFT/LCD displays, dot matrix display, or any other similar graphical display. Furthermore, the graphical data may encompass simple text data or detailed pictures.

Upon receiving the data and determining how the data may be displayed by the screen, the screen may utilize a dedicated portion 505 to display the data. Furthermore, different areas and methods may be utilized to display the data. For example, the data may be displayed on a dedicated portion 505 for turn by turn directions. In another embodiment, the display may utilize a status bar to display any data that is received by the nomadic device. In yet another embodiment, the data may be shown in a drop-down menu upon receiving the data from the nomadic device. Different configurations may utilize dedicated space for the incoming data, or even overlap with other areas 503 of the user interface. A VCS may require all or only a portion of the screens to be prepared to handle the incoming data from the nomadic device. A screen which does not contain a dedicated portion, may even display the incoming data utilizing the whole display screen of the VCS.

The vehicle based computing system may determine the methodology of outputting the data on a display screen of the vehicle based computing system based on the current screen condition of the multimedia system, as well as the condition of the nomadic device. The data that the VCS receive from the nomadic device may indicate certain conditions that determine when or how a graphical output is coordinated with the VCS. For example, graphical data indicating traffic flow or a traffic map may not be output until the VCS has determined that the vehicle is on a certain road or the vehicle is operating higher or lower than certain vehicle threshold speed. Additionally, the VCS may utilize a timer to delay the output of the incoming data based on conditions of the nomadic device and the VCS.

In alternative embodiments, the VCS may display a map screen and the data received from the nomadic device may be utilized to overlay additional contents from the nomadic device. The additional contents may include traffic, weather, points of interest (POIs), parking, local concerts/events, fuel station prices, etc. The nomadic device may provide additional dynamic contents that were not available with the VCS, but may be available with the aid of the nomadic device. It should be noted that the graphical/textual data that is streamed from the nomadic device may have further application besides navigation related aspects. Data may include artist/album information and artwork, contact information, pictures, videos, etc.

Figure 5B:
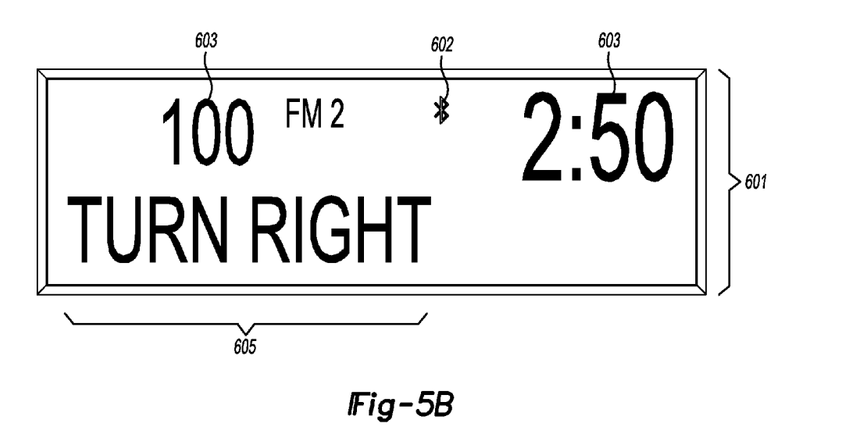
FIG. 5B illustrates a vehicle dot matrix display outputting navigation guidance instructions.

FIG. 5B illustrates navigation guidance instructions displayed on a vehicle based computing system that is utilizing a dot matrix display. Although FIG. 5 illustrates one HMI template that may be utilized for displaying the received data, a number of different figures may be utilized. For example, each portion of the display of the dot matrix display may be utilized to display the turn by turn directions, rather than utilizing a dedicated portion of the dot matrix display. Furthermore, the text or graphics that are received by the VCS may utilize the whole screen rather than just a portion of the screen.

The display 601 of FIG. 5B utilizes a dot matrix display to output text information that is based on the data received by the nomadic device. The guidance information 605 is displayed in text form based on the illustrative example of FIG. 5B, but may also display graphic images. The guidance information 605 maybe shown concurrently with the other information needed for the HMI. Other information may include audio information, temperature info, phone information, etc. Furthermore, the display 601 may be able to output whether a connection with the nomadic device is present 602.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for outputting visual data from a mobile device application on a mobile computing device to a vehicle display, the system comprising:
    a wireless transceiver for communicating signals between a mobile computing device and a vehicle computing system having a graphical display;
    wherein the vehicle computing system is configured to:
    i. receive a caller identification string from the mobile computing device identifying a mobile device application configured to operate with the vehicle computing system;
    ii. receive a wireless signal from the mobile computing device representative of a visual indication to be displayed on the vehicle display;

iii. determine a location to display the visual indication on the display; and
iv. output the visual indication on the vehicle display at the determined location.

2. The system of claim 1, wherein the visual indication includes turn by turn information related to a navigation application.

3. The system of claim 1, wherein the visual indication includes text data related to turn by turn information related to a navigation application.

4. The system of claim 1, wherein the visual indication includes graphical data related to turn by turn information related to a navigation application.

5. The system of claim 1, wherein the caller identification string includes a calling line identification presentation.

6. The system of claim 1, wherein the caller identification string contains an alpha-numeric number that is insufficient for making an operable phone-call to a phone line.

7. The system of claim 1, wherein the vehicle computing system is further configured to receive an audio video remote control profile message with a header indicating the mobile device is requesting to output the visual indication.

8. The system of claim 1, wherein the wireless signal from the mobile computing device includes an attention command.

9. The system of claim 8, wherein the attention command is a list current call command.

10. The system of claim 1, wherein the wireless signal is received from the mobile computing device utilizing an enhanced synchronous connection-oriented link.

11. The system of claim 1, wherein the wireless signal is received from the mobile computing device utilizing a synchronous connection-oriented link.

12. A mobile device utilizing a mobile application that outputs visual data to a vehicle computer system and to be output on a vehicle display, the device comprising:
a wireless transceiver for communicating signals from the mobile device to the vehicle computing system for processing by the vehicle computing system; and
a processor configured to:
i. send a caller identification string to the vehicle computer system using the wireless transceiver, the caller identification identifying the mobile application;
ii. receive a request from the vehicle computer system to send the visual data to the vehicle computer system;
iii. send a wireless signal to the vehicle computing device representative of a visual indication to be displayed in the vehicle.

13. The device of claim 12, wherein the visual indication contains text data of guidance instructions related to the mobile application.

14. The device of claim 12, wherein the mobile application is a navigation application.

15. The device of claim 12, wherein the caller identification string is a calling line identification presentation.

16. The device of claim 12, wherein the caller identification string is sent to the vehicle computer system utilizing a synchronous connection-oriented link.

17. The device of claim 12, wherein the caller identification string is sent to the vehicle computer system utilizing an enhanced synchronous connection-oriented link.

18. The device of claim 12, wherein the processor is further configured to send a wireless signal to the vehicle computing device representative of an audible statement that corresponds to the visual indication to be displayed in the vehicle.

19. A vehicle computing system (VCS) comprising:
a wireless transceiver for communication between a mobile device (MD) and the VCS; and
a processor configured to:
i. receive a caller identification string from the MD identifying an application is operating on the MD;
ii. receive vehicle output data from the identified application instructing output to a vehicle display;
iii. output the received data to the vehicle display and in accordance to the instructions.

20. The vehicle computing system of claim 19, wherein the caller identification string is sent to the vehicle computer system utilizing an enhanced synchronous connection-oriented link.

* * * * *